United States Patent
Benner et al.

(10) Patent No.: US 9,726,829 B2
(45) Date of Patent: *Aug. 8, 2017

(54) BLIND MATING STRAIN RELIEVED OPTICAL FIBER CONNECTOR

(71) Applicant: International Business Machines Corporation, Armonk, NY (US)

(72) Inventors: Alan F. Benner, Poughkeepsie, NY (US); Mark A. Brandon, Poughkeepsie, NY (US); Michael J. Ellsworth, Poughkeepsie, NY (US); Eric J. McKeever, Poughkeepsie, NY (US); Thong N. Nguyen, Poughkeepsie, NY (US); Edward J. Seminaro, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/849,895

(22) Filed: Sep. 10, 2015

(65) Prior Publication Data
US 2016/0223763 A1  Aug. 4, 2016

Related U.S. Application Data

(63) Continuation of application No. 14/613,998, filed on Feb. 4, 2015.

(51) Int. Cl.
*G02B 6/42* (2006.01)
*G02B 6/38* (2006.01)

(52) U.S. Cl.
CPC ......... *G02B 6/3829* (2013.01); *G02B 6/3825* (2013.01); *G02B 6/3887* (2013.01);
(Continued)

(58) Field of Classification Search
USPC ..................................................... 385/60, 32
See application file for complete search history.

(56) References Cited

U.S. PATENT DOCUMENTS

| 5,073,044 A | 12/1991 | Egner et al. |
| 5,138,678 A | 8/1992 | Briggs et al. |

(Continued)

FOREIGN PATENT DOCUMENTS

| JP | 5158870 B2 | 3/2013 |
| WO | 2013126068 A1 | 8/2013 |

OTHER PUBLICATIONS

"The FOA Reference for Fiber Optics—Outside Plant Fiber Optic Cables", © 1999-2008 The Fiber Optic Association, Inc., downloaded on Nov. 10, 2014, <http://www.thefoa.org/tech/ref/OSP/cable.html>.

(Continued)

*Primary Examiner* — Eric Wong
(74) *Attorney, Agent, or Firm* — Maeve Carpenter

(57) ABSTRACT

Aspects of the present invention include an optical fiber connector for connecting optical fibers. The optical fiber connector includes a ferrule coupled to one or more optical fiber ribbons. The optical fiber connector includes a connector housing coupled with a radius controlled ribbon bending housing. The connector housing surrounds the ferrule on at least four sides, and the one or more optical fiber ribbons coupled to the ferrule are within the connector housing. The optical fiber connector includes a strain relief clamp coupled with the radius controlled ribbon bending housing.

9 Claims, 7 Drawing Sheets

(52) U.S. Cl.
CPC .......... *G02B 6/4292* (2013.01); *G02B 6/3821* (2013.01); *G02B 6/3885* (2013.01)

(56) References Cited

U.S. PATENT DOCUMENTS

| | | | |
|---|---|---|---|
| 5,347,603 A | 9/1994 | Belenkiy et al. | |
| 5,710,851 A | 1/1998 | Walter et al. | |
| 6,496,642 B2 | 12/2002 | Gonzalez et al. | |
| 6,789,953 B1* | 9/2004 | deJong | G02B 6/3825 385/73 |
| 7,217,040 B2 | 5/2007 | Crews et al. | |
| 7,455,463 B2 | 11/2008 | Togami et al. | |
| 7,991,252 B2 | 8/2011 | Cheng et al. | |
| 8,313,249 B2 | 11/2012 | Gurreri et al. | |
| 8,417,071 B2 | 4/2013 | Hopkins et al. | |
| 8,478,099 B2 | 7/2013 | Rolston | |
| 8,529,140 B2 | 9/2013 | McColloch | |
| 8,632,260 B2 | 1/2014 | Szilagyi | |
| 9,395,507 B1* | 7/2016 | Gross | G02B 6/4446 |
| 2002/0012504 A1 | 1/2002 | Gillham et al. | |
| 2002/0150352 A1* | 10/2002 | Ngo | G02B 6/4478 385/86 |
| 2004/0120656 A1* | 6/2004 | Banas | G02B 6/3887 385/86 |
| 2004/0252949 A1* | 12/2004 | Verhagen | G02B 6/3887 385/86 |
| 2006/0115217 A1 | 6/2006 | Childers et al. | |
| 2007/0137885 A1 | 6/2007 | Robinson et al. | |
| 2009/0297099 A1* | 12/2009 | Benjamin | G02B 6/25 385/32 |
| 2010/0215319 A1 | 8/2010 | Childers et al. | |
| 2012/0063718 A1 | 3/2012 | Steijer et al. | |
| 2012/0093462 A1 | 4/2012 | Childers et al. | |
| 2013/0156386 A1 | 6/2013 | Miller | |
| 2013/0287404 A1 | 10/2013 | McColloch et al. | |

OTHER PUBLICATIONS

"Inside Plant Cable", © 2014 AFL, downloaded on Nov. 10, 2014, <https://www.aflglobal.com/Products/Fiber-Optic-Cable/Enterprise/Inside-Plant-Cable.aspx>.

U.S. Appl. No. 14/613,998, filed Feb. 4, 2015.

List of IBM Patents or Patent Applications Treated as Related (Appendix P), filed herewith.

* cited by examiner

BLIND MATING STRAIN RELIEVED OPTICAL FIBER CONNECTOR

STATEMENT REGARDING FEDERALLY SPONSORED WORK

This invention was made with United States Government support under contract number H98230-13-D-0122 entered with the following United States Governmental Agency: Department of Defense. The United States government has certain rights to this invention.

BACKGROUND OF THE INVENTION

The present invention relates generally to the field of optical communications, and more particularly to a connector assembly for interconnecting one or more integrated parallel optical transceiver devices with an array of optical fibers.

Optical fibers are becoming more commonly used for signal transmission in communications and information handling applications. Optical fibers provide a large increase in the signal transmission bandwidth of a transmission cable over a given distance when compared with the bandwidth provided by conventional wire transmission cables. Because optical transmission cables do not experience frequency-dependent attenuation of signals to the extent that conventional wire transmission cables do, a greater amount of signal data can be transmitted over optical transmission cables of comparable length. In addition, signal transmission through optical fibers provides improved density versus transmission through electrical wires, since, for a given bandwidth, the cross-sectional areas of optical fiber cables and connectors are significantly smaller than for comparable electrical cables. In information handling applications, such as computer systems having large information storage capabilities, optical fiber transmission cables are used to provide connections between units of the computer system in order to most efficiently transmit large amounts of information from unit to unit.

Connectors are used for joining light-transmitting optical fiber cables to transmitter devices, receiver devices, or to other cables. Optical fibers however, have the disadvantage of being more physically fragile in some respects than metallic copper wire. For example, there is a limit on the minimum bend radius to which an optical fiber may be bent or curved before degradation in the light transmission through the fiber occurs. The optical fiber begins to leak light from the core due to the bend in the optical fiber. This loss of light from the optical fiber thereby increases the attenuation of the optical signals within the optical fiber. In addition, internal micromechanical stresses in the optical fiber caused by the tight bending can also physically degrade the optical fiber by reducing the amount of mechanical stress the optical fiber may endure prior to breaking. Therefore the handling and routing of optical fibers and cables requires extra precaution to ensure that the optical fibers are reliable at initial installation and over time.

SUMMARY

Aspects of the present invention include an optical fiber connector for connecting optical fibers. The optical fiber connector includes a ferrule coupled to one or more optical fiber ribbons. The optical fiber connector includes a connector housing coupled with a radius controlled ribbon bending housing. The connector housing surrounds the ferrule on at least four sides, and the one or more optical fiber ribbons coupled to the ferrule are within the connector housing. The optical fiber connector includes a strain relief clamp coupled with the radius controlled ribbon bending housing.

DETAILED DESCRIPTION

Figure 1A:
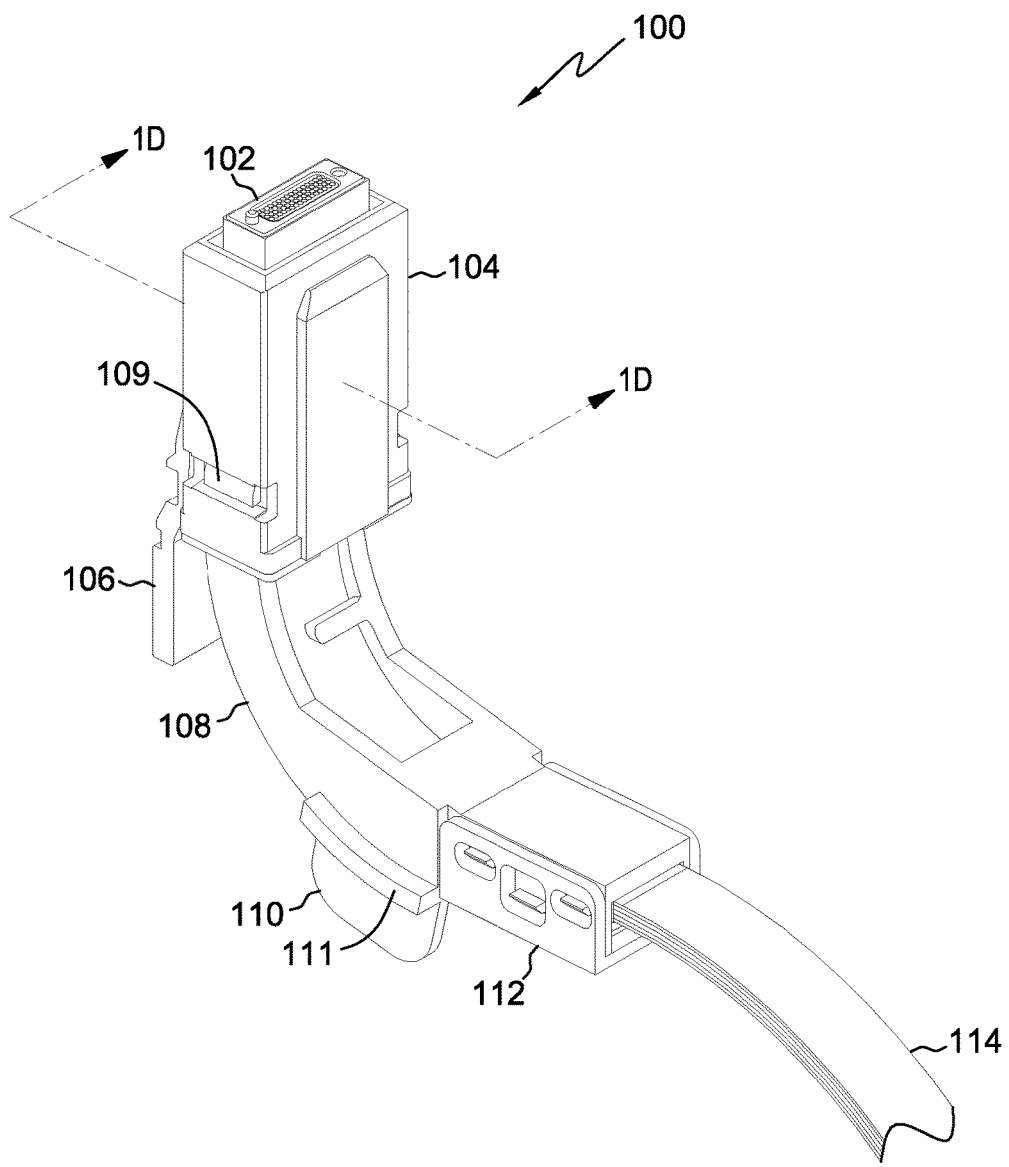
FIG. 1A depicts an isometric view of an optical fiber connector, in accordance with an embodiment of the present invention.

Electronic devices, and specifically semiconductor chips, are becoming increasingly dense and capable of supporting increasing bandwidth. It is estimated that high performance chips may soon require thousands of signal input/output (I/O) channels. While some percentage of the I/Os can be implemented as electrical I/Os through printed circuit boards (PCB), the signal integrity limitations of electrical I/Os, due to resistance loss, emission, radiation, and crosstalk, indicate advantages to implementing a significant percentage of I/Os with optical signals. At the scale of density required by high performance electrical packages, optical fiber connector design is important. As optical transceivers are developed to support an increasing number of optical fibers, there is a need for an optical connector for high-performance information processing equipment that can handle a large quantity of optical fibers in a very small space and simultaneously protect the fibers from mechanical stress due to bending and/or pulling as the information processing equipment is assembled and deployed.

Embodiments of the present invention recognize that optical fiber connector performance can be improved by providing a design for a blind mating optical fiber connector that provides strain relief to the optical fibers in a robust, cost effective package. Implementation of embodiments of the invention may take a variety of forms, and exemplary implementation details are discussed subsequently with reference to the Figures.

Embodiments of the present invention will now be described in detail with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, and elements and features can have different dimensions than those depicted in the figures. Therefore, specific structural and functional details disclosed herein are not to be interpreted as limiting, but merely as a representative basis for teaching one skilled in the art to variously employ the present invention.

References in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIGS. 1A through 1D provide only an illustration of one implementation and do not imply any limitations with regard to different embodiments which may be implemented. Many modifications to the depicted embodiment may be made by those skilled in the art without departing from the scope of the invention as recited by the claims.

FIG. 1A depicts an isometric view of optical fiber connector 100, in accordance with an embodiment of the present invention. Optical fiber connector 100 includes ferrule 102, connector housing 104, latch 106, radius controlled ribbon bending housing 108, molded catch 109, guide rails 110, routing shelf 111, strain relief clamp 112, and fiber ribbons 114. Optical fiber connector 100 is blind mateable, and therefore can be used with a transceiver device which includes electronic devices on one side of a carrier and optical signals exiting the device from the opposite side of the carrier, such that the optical fibers are not immediately visible.

A ferrule is most commonly utilized in an optical fiber connector for connecting an optical fiber with other optical fibers or optical elements. In an embodiment, ferrule 102 is designed to mate with a transceiver package that includes up to, and including, 64 optical fibers (32 transmitting and 32 receiving). The shape of ferrule 102 may be the same as the shape of a ferrule used in industry standard multi-fiber push on (MPO) connectors. MPO connectors are widely used in data center optical fiber trunking systems and in supercomputer optical interconnect fabric cabling. Ferrule 102 is spring-loaded (not shown), similar to standard optical connector designs, enabling ferrule 102 to float against a transceiver when optical fiber connector 100 mates to a transceiver, or against another ferrule when optical fiber connector 100 is mated to another optical fiber connector. In one embodiment, ferrule 102 is an expanded beam coupling ferrule, using lenses to couple optical signals between optical fibers, as is known in the art. In another embodiment, ferrule 102 may incorporate hermaphroditic molded alignment features to provide precise alignment for mating optical fibers.

Connector housing 104 surrounds ferrule 102 on at least four sides and is used as protection for ferrule 102 and fiber ribbons 114 during handling. Connector housing 104 is made of one of a plurality of molded plastics available for connector applications known in the art. Connector housing 104 incorporates latch 106. Latch 106 is a method for keeping optical fiber connector 100 in place in a suitable receptacle, as is known in the art. Latch 106 may be similar in design to latches found on industry standard registered jack 45 (RJ45) connector used for Ethernet electrical cables.

Figure 1B:
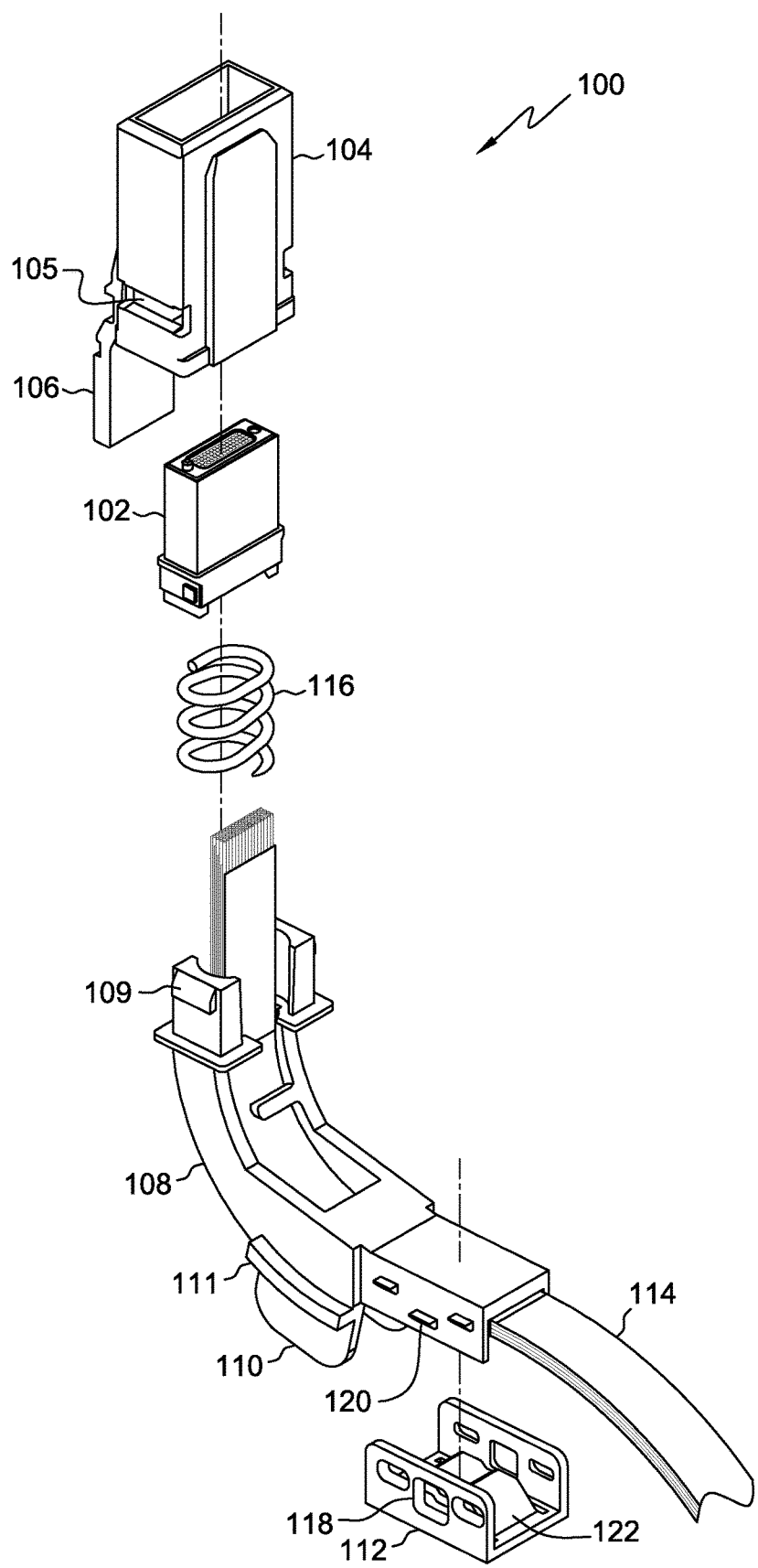
FIG. 1B depicts an exploded view of the optical fiber connector of FIG. 1A, in accordance with an embodiment of the present invention.

As part of the strain relief designed into optical fiber connector 100, radius controlled ribbon bending housing 108 provides a smooth, 90 degree bend in fiber ribbons 114 with precise control over the bend radius to support a fiber routing structure typically seen in server and switch/router system designs. The 90 degree bend prevents severe bending or kinking of fiber ribbons 114. Radius controlled ribbon bending housing 108 is made of one of a plurality of molded plastics available for connector applications known in the art. Radius controlled ribbon bending housing 108 is coupled with connector housing 104. In an embodiment, radius controlled ribbon bending housing 108 is inserted into connector housing 104 and snaps into opening 105, as depicted in FIG. 1B, via molded catch 109.

Radius controlled ribbon bending housing 108 incorporates guide rails 110 and routing shelf 111. Guide rails 110 may be used to control the routing of fiber ribbons from an optical fiber connector adjacent to optical fiber connector 100 in a longitudinal direction, such that fiber ribbons from the two connectors can be interspersed or overlaid on top of each other, depending on the side to side alignment of the connectors. Routing shelf 111 may be used to control the routing of fiber ribbons from an optical fiber connector adjacent to optical fiber connector 100 in a longitudinal direction with fiber ribbons routed between two optical fiber connectors adjacent in a lateral direction. Guide rails 110 and routing shelf 111 are depicted and described in further detail with respect to FIG. 2.

As part of the strain relief designed into optical fiber connector 100, strain relief clamp 112 provides sufficient clamping force to hold fiber ribbons 114 against stresses encountered during assembly and operation of the system in which optical fiber connector 100 operates, while not clamping the fiber ribbons 114 hard enough to damage or break the optical fibers. Strain relief clamp 112 is made of one of a plurality of molded plastics available for connector applications known in the art. Strain relief clamp 112 is depicted and described in further detail with respect to FIG. 1B.

In one embodiment, fiber ribbons 114 may include up to four separate optical fiber ribbons. A fiber ribbon comprises multiple optical fibers routed in parallel with each other. In one embodiment, each ribbon contains 16 optical fibers, for a total of 64 optical fibers when four ribbons are present. Fiber ribbons 114 are inserted into radius controlled ribbon bending housing 108 and are at least partially surrounded by radius controlled ribbon bending housing 108. Fiber ribbons 114 are coupled with ferrule 102. In one embodiment, fiber ribbons 114 are coupled with ferrule 102 with one of a plurality of adhesives known in the art.

FIG. 1B depicts an exploded view of optical fiber connector 100 of FIG. 1A, in accordance with an embodiment of the present invention. In addition to the elements already described with respect to FIG. 1A, the view depicted in FIG. 1B includes spring 116. The placement of spring 116 enables ferrule 102 to retract within connector housing 104 during actuation and mating with a transceiver module or with another optical fiber connector. When engaged, spring 116 applies a continuous force to ferrule 102 and prevents ferrule 102 from changing position relative to a mated transceiver module or mated optical fiber connector. Spring 116 encircles fiber ribbons 114 and sits below ferrule 102, as depicted, such that spring 116 is in contact with ferrule 102 during actuation of ferrule 102. The view depicted in FIG. 1B also includes opening 105 in connector housing 104 and molded catch 109 on radius controlled ribbon bending housing 108. The mechanical coupling of opening 105 with molded catch 109 seats radius controlled ribbon bending housing 108 securely within connector housing 104 such that radius controlled ribbon bending housing 108 and connector housing 104 remain coupled during mating of optical fiber connector 100 to a transceiver or to another optical fiber connector.

Also depicted in FIG. 1B is strain relief clamp 112 in an unlatched position. Strain relief clamp 112 includes snap catches 118 on opposite sides. During assembly of optical fiber connector 100, snap catches 118 engage with snaps 120. Snaps 120 are coupled with radius controlled ribbon bending housing 108. In one embodiment, snaps 120 are molded into opposite sides of radius controlled ribbon bending housing 108. When snap catches 118 engage with snaps 120, strain relief clamp 112 is securely held in place. In the depicted embodiment, the middle pair of snaps 120 and snap catches 118 hold strain relief clamp 112 loosely onto radius controlled ribbon bending housing 108, pressing fiber ribbons 114 lightly such that each fiber ribbon can be individually slid into position to control the slack in each fiber ribbon inside optical fiber connector 100. Once each of the one or more fiber ribbons 114 is correctly placed within controlled ribbon bending housing 108, strain relief clamp 112 can be snapped into place using the outer pairs of snap catches 118 and snaps 120, locking the whole assembly of fiber ribbons 114 together in optical fiber connector 100 in a precisely correct position. Strain relief clamp 112 also incorporates clamp spring 122. By design, clamp spring 122 enables a precisely controlled amount of pressure to be placed on the stack of one or more fiber ribbons 114 when strain relief clamp 112 snaps into place. One skilled in the art can identify a plurality of clamp spring designs that may be incorporated into the design of optical fiber connector 100. A clamp spring design varies, depending on the number of fiber ribbons. In the depicted embodiment, clamp spring 122 is a "W" spring, molded into the cover of strain relief clamp 112. An alternate embodiment of strain relief clamp 112 is depicted and described in further detail with respect to FIG. 3.

Figure 1C:
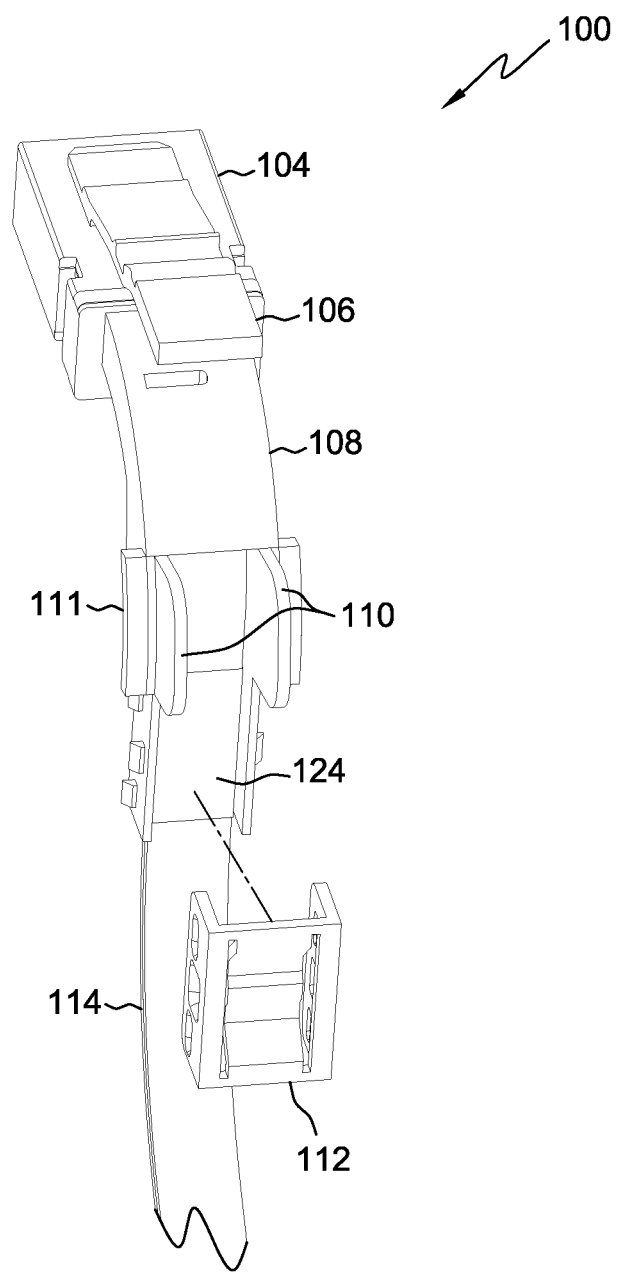
FIG. 1C depicts an isometric view of a side of the optical fiber connector opposite the side of the optical fiber connector depicted in FIG. 1A, in accordance with an embodiment of the present invention.

FIG. 1C depicts an isometric view of a side of optical fiber connector 100 opposite the side of optical fiber connector 100 depicted in FIG. 1A, in accordance with an embodiment of the present invention. The Figure depicts guide rails 110 as parallel protrusions, extending from radius controlled ribbon bending housing 108. The space between guide rails 110 is wide enough to fit a stack of one or more fiber ribbons from an adjacent optical fiber connector and align the stack. In one embodiment, if two connectors are positioned next to each other, then a stack of one or more fiber ribbons from an adjacent optical fiber connector can be positioned on routing shelf 111, aligned by guide rails 110 of the two neighboring optical fiber connectors. In addition to the elements already described with respect to FIG. 1A, the view depicted in FIG. 1C includes sleeves 124. Each of the one or more fiber ribbons 114 is fitted with a sleeve, such as sleeves 124, that provides individual padding around each fiber ribbons 114. Sleeves 124 protect individual fiber ribbons 114 from damage and hold each fiber ribbons 114 from moving within strain relief clamp 112 under applied strain. Sleeves 124 are made of one of a plurality of materials known in the art that provides a fairly high coefficient of static friction such that sleeves 124 do not easily slide along the surface of fiber ribbons 114 when compressed.

Figure 1D:
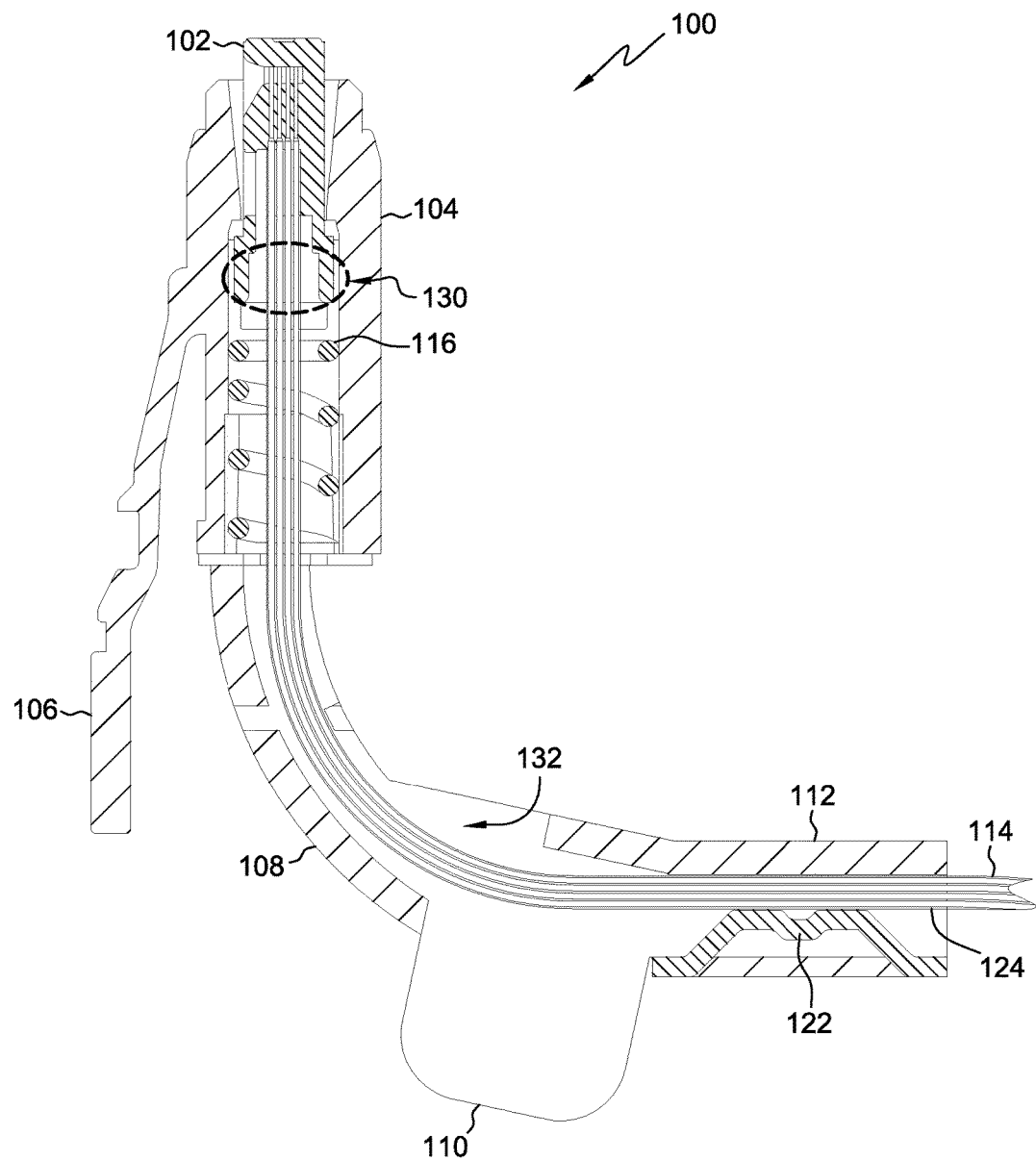
FIG. 1D is a cross sectional view of the optical fiber connector of FIG. 1A, in accordance with an embodiment of the present invention.

FIG. 1D is a cross sectional view of optical fiber connector 100 of FIG. 1A, in accordance with an embodiment of the present invention. From the cross sectional view, the strain relief structure designed into radius controlled ribbon bending housing 108 and used to manage stress, and the accompanying strain, on fiber ribbons 114 is evident, as seen by the smooth bending, i.e., controlled bending with no kinks, of fiber ribbons 114 within radius controlled ribbon bending housing 108. As is known in the art, optical fibers are thin and somewhat fragile under compression, particularly in a longitudinal direction. In addition, optical fibers are stiff, nearly incompressible, which can cause stress when multiple fiber ribbons are laid over each other in curved paths with one or both ends of the fiber ribbons clamped or glued. The insertion of fiber ribbons 114 into ferrule 102 is depicted in the Figure by arrow 130. In one embodiment, actuation of ferrule 102 requires that ferrule 102 retreat within connector housing 104 by one to one and a half millimeters during actuation. The vertical movement of ferrule 102 is taken up within radius controlled ribbon bending housing 108 by adjustment of fiber ribbons 114 between ferrule 102 and strain relief clamp 112 within the body of radius controlled ribbon bending housing 108, at the lower right of the Figure, as indicated by arrow 132. Fiber ribbons 114 do not move to the right, outside of strain relief clamp 112. In the depicted embodiment, each of four sleeves 124 surrounds one of four fiber ribbons 114.

Figure 2:
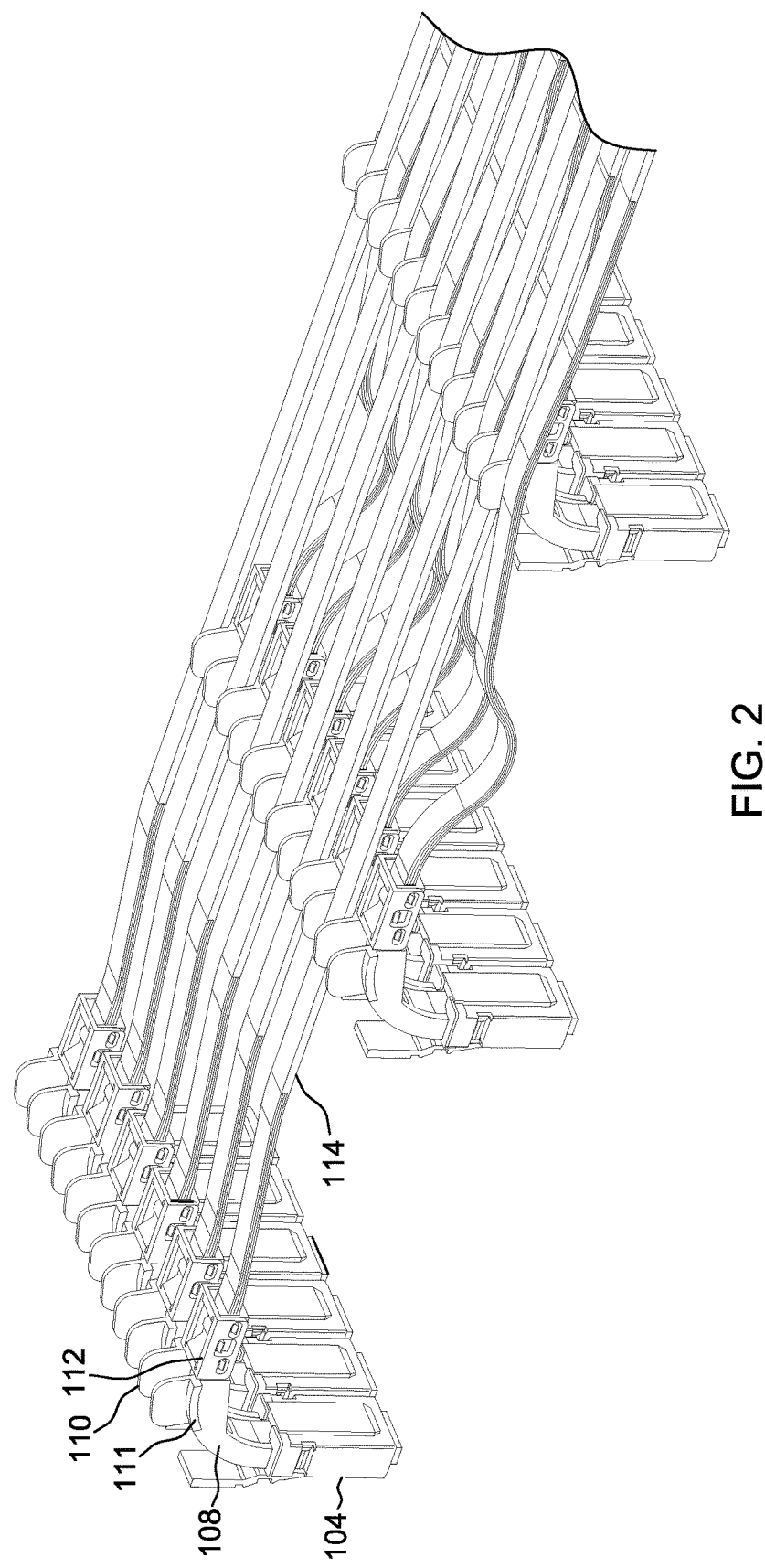
FIG. 2 depicts an isometric view of three sets of six adjacent optical fiber connectors, in accordance with an embodiment of the present invention.

FIG. 2 depicts an isometric view of three sets of six adjacent optical fiber connectors, in accordance with an embodiment of the present invention. As described with respect to FIG. 1C, guide rails 110 and routing shelf 111 align optical fiber ribbons between adjacent optical fiber connectors, enabling management and organization of optical fiber ribbons in a densely packed array.

Figure 3A:
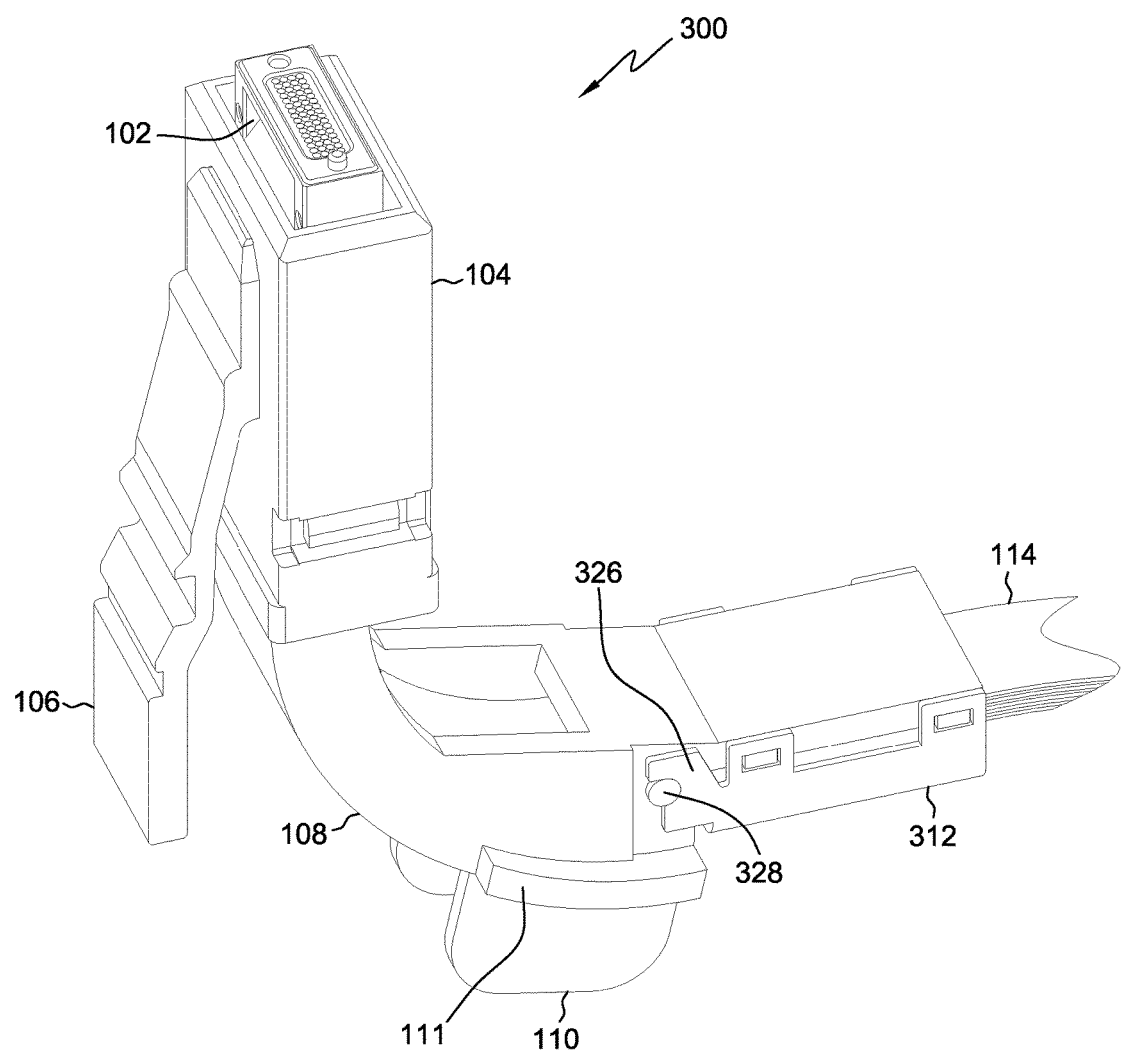
FIG. 3A depicts an isometric view of an optical fiber connector with an alternate strain relief clamp in a latched position, in accordance with an embodiment of the present invention.

FIG. 3A depicts an isometric view of optical fiber connector 300 with alternate strain relief clamp 312 in a latched position, in accordance with an embodiment of the present invention. In the depicted embodiment, strain relief clamp 312 incorporates hook 326 on opposite sides. Hook 326 couples with pin 328 to mate with radius controlled ribbon bending housing 108. In an embodiment, pin 328 is molded into opposite outer sides of radius controlled ribbon bending housing 108. In an embodiment, hook 326 couples with pin 328 by placing hook 326 in contact with pin 328 such that hook 326 has the ability to slide around pin 328 for at least a short distance. The coupling of hook 326 with pin 328 enables precise alignment of strain relief clamp 312 with radius controlled ribbon bending housing 108.

Figure 3B:
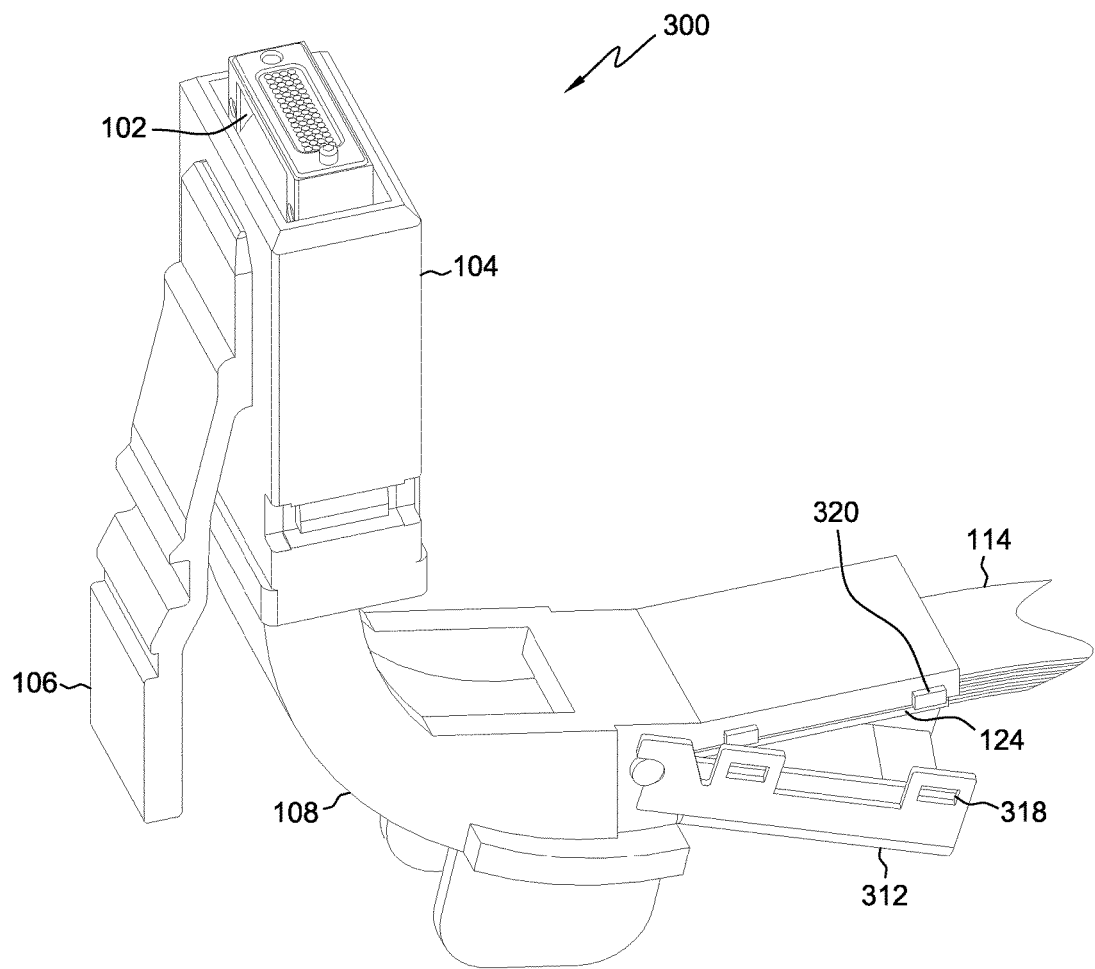
FIG. 3B depicts an isometric view of the optical fiber connector with the alternate strain relief clamp in an unlatched position, in accordance with an embodiment of the present invention.

FIG. 3B depicts an isometric view of optical fiber connector 300 with alternate strain relief clamp 312 in an unlatched position, in accordance with an embodiment of the present invention. Strain relief clamp 312 also incorporates snap catches 318 on opposite outer sides. Snap catches 318 engage with snaps 320. Snaps 320 are coupled with radius controlled ribbon bending housing 108. In an embodiment, snaps 320 are molded into opposite sides of radius controlled ribbon bending housing 108. When snap catches 318 engage with snaps 320, strain relief clamp 312 is securely held in place. When strain relief clamp 312 is unlatched, strain relief clamp 312 can be completely removed from radius controlled ribbon bending housing 108 during connector assembly or disassembly. A portion of sleeves 124 is also visible in the Figure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. An optical fiber connector comprising:
   a ferrule coupled to one or more optical fiber ribbons;
   a connector housing coupled with a radius controlled ribbon bending housing, wherein the connector housing surrounds the ferrule on at least four sides, and the one or more optical fiber ribbons coupled to the ferrule are within the connector housing, and wherein the radius controlled ribbon bending housing incorporates one or more guide rails, wherein the one or more guide rails are parallel protrusions extending from the radius controlled ribbon bending housing, and wherein a space between the one or more guide rails is wide enough to fit a stack of one or more fiber ribbons from an adjacent optical fiber connector and align the stack; and
   a strain relief clamp coupled with the radius controlled ribbon bending housing, wherein the radius controlled ribbon bending housing includes at least one pin and the strain relief clamp includes at least one hook, and wherein the strain relief clamp couples with the radius controlled ribbon bending housing when the at least one hook of the strain relief clamp slides around the at least one pin of the radius controlled ribbon bending housing.

2. The optical fiber connector of claim 1, wherein the radius controlled ribbon bending housing incorporates one or more routing shelves, and wherein the one or more guide rails and the one or more routing shelves are positioned such that when a first optical fiber connector and a second optical fiber connector are positioned next to each other, a stack of one or more fiber ribbons from the first optical fiber connector can be positioned on the one or more routing shelves and aligned by the one or more guide rails of the second optical fiber connector.

3. The optical fiber connector of claim 1, wherein the radius controlled ribbon bending housing includes at least one snap, and wherein the strain relief clamp includes at least one snap catch.

4. The optical fiber connector of claim 3, wherein the strain relief clamp couples with the radius controlled ribbon bending housing when the at least one snap of the radius controlled ribbon bending housing engages with the at least one snap catch of the strain relief clamp.

5. The optical fiber connector of claim 1, wherein the connector housing includes at least one opening, and wherein the radius controlled ribbon bending housing includes at least one molded catch.

6. The optical fiber connector of claim 5, wherein the connector housing and the radius controlled ribbon bending housing couple when the at least one opening of the connector housing engages with the at least one molded catch of the radius controlled ribbon bending housing.

7. The optical fiber connector of claim 1, wherein the radius controlled ribbon bending housing provides a smooth 90 degree bend for the one or more optical fiber ribbons.

8. The optical fiber connector of claim 1, wherein the ferrule can couple with up to 64 fibers.

9. The optical fiber connector of claim 1, further comprising a spring within the connector housing, wherein the spring surrounds the one or more optical fiber ribbons, and wherein the ferrule is in contact with the spring such that the ferrule can retract within the connector housing.

* * * * *